2 Sheets—Sheet 1.
J. W. MOORE & J. A. SVEDBERG.
CAR BRAKES AND STARTERS.
No. 185,343. Patented Dec. 12, 1876.
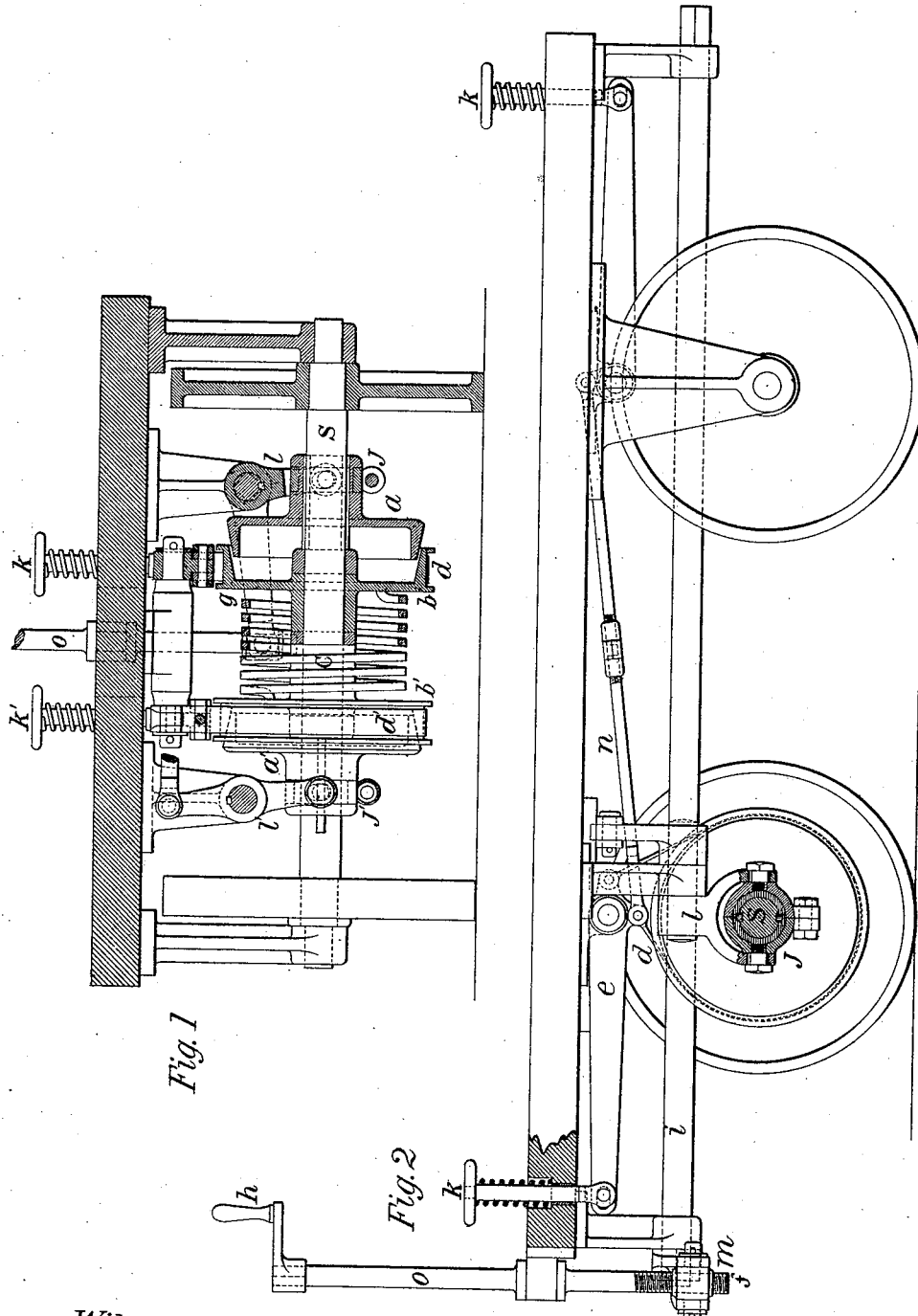
Witnesses:
H. Webster
Julius Tolger
Inventors:
Jno. W. Moore
John A. Svedberg 2 Sheets—Sheet 2.

J. W. MOORE & J. A. SVEDBERG.
CAR BRAKES AND STARTERS.

No. 185,343. Patented Dec. 12, 1876.

Witnesses:
H. Webster.
Julius Folger.

Inventors:
Jno. W. Moore
John A. Svedberg.

UNITED STATES PATENT OFFICE.

JOHN W. MOORE AND JOHN A. SVEDBERG, OF WASHINGTON, D. C.

IMPROVEMENT IN CAR BRAKES AND STARTERS.

Specification forming part of Letters Patent No. 185,343, dated December 12, 1876; application filed September 28, 1876.

*To all whom it may concern:*

Be it known that we, JOHN W. MOORE and JOHN A. SVEDBERG, of Washington, District of Columbia, have invented certain new and useful Improvements in Car Starters and Brakes; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The object of this invention is to produce a simple and efficient mechanism for stopping a street-car, and for storing up the power required in stopping for use again in starting the car.

Figure 4:
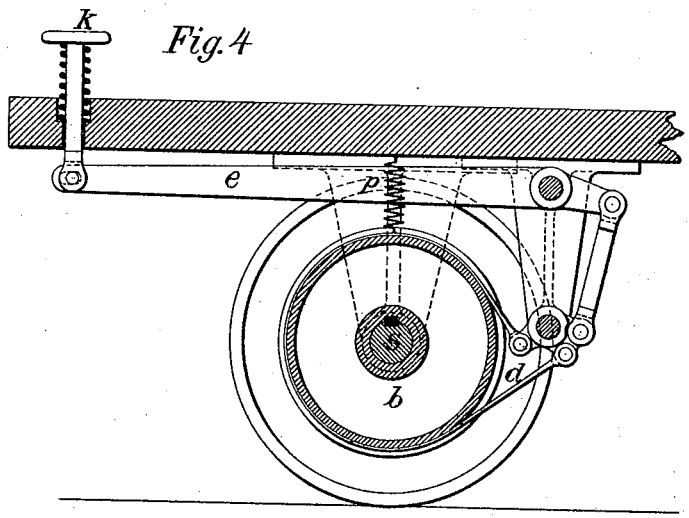

S is the axle of the car. The wheels $b$ and $b'$ are hung loosely on this axle. The hubbed wheels $a$ and $a'$ are attached to the shaft by means of a feather, so as to revolve with it, but are loose, so that they can be moved in line with the axle by means of the forked lever or clutch-yoke $l$ $l'$. The peripheries of $a$ and $a'$ are conical, and, when in contact with a similar angle-face on the inside of the wheels $b$ and $b'$, form a conical friction-clutch, which causes all the wheels to revolve together. Between the wheels $b$ and $b'$ a spring is coiled around the axle, one end of which is attached to each wheel. These wheels have on their circumferences an annular groove, in which is placed the bands $d$ and $d'$, which, in connection with the lever $e$, forms a band-brake, operated by pressure upon the foot-plate and spindle $k$. Fig. 4 shows this brake arrangement alone, the fulcrum of the lever placed on a horizontal line with the axle, and having a spiral spring, $p$, whose office it is to take the weight of the band off the wheel when not in use. The clutch-yokes $l$ and $l'$ are operated through the medium of the arm $g$, shaft $i$, and threaded spindle $o$, or any equivalent device, the object being to move the wheels $a$ and $a'$ in line with the axle and bring the cone-surfaces of the wheels $a$ and $a'$ in contact with the corresponding surfaces of $b$ and $b'$.

The operation of this invention is as follows: The car being in motion, and it being desired to stop it, the handle $h$ is turned till the wheels $a'$ and $b'$ are brought into contact and $b'$ commences to revolve. The foot of the operator is placed upon the plate $k$, which holds the wheel $b$ fixed and connects it with the body of the car. As the end of the spring $c$ is fastened to the revolving wheel $b'$, and the other end to the fixed wheel $b$, it follows that the spring will be wound up till it stops the car. The operator then places his other foot on the plate $k'$, tightening the band $d'$, and thus holding the wheel $b'$ firmly. He then turns the handle $h$ in a direction opposite to that by which he connected the cone-friction $a'$ $b'$ till these wheels are disconnected and $a$ and $b$ are connected. The car in this position is ready to start, and upon the signal to do so the pressure is removed from the foot-pad $k$, and the whole force of the spring accumulated in stopping the car is now exerted in assisting its forward movement. When the car has started and the spring unwound, the operator removes his foot from the button $k'$, and, disconnecting $a$ and $b$, connects $a'$ and $b'$, and is again ready to stop.

Figure 3:
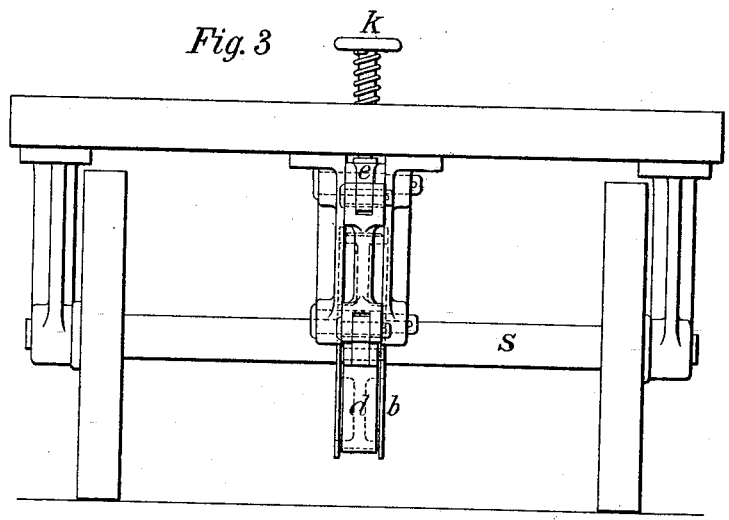

When it is desired simply to check the car, the cone-friction $a'$ $b'$ being connected and ready at any moment to stop, the driver places his foot upon the button $k$ and presses with greater or less weight, as he wishes to check the speed more or less; or, should he wish to check or stop the car without operating the spring, (and accumulating the force,) the cone-friction $a'$ $b'$ being connected, he can, with his foot, press down upon $k'$, bringing the band-friction $d'$ in operation directly on the surface of $b'$. This is more clearly represented in Figs. 3 and 4, where the cone-friction is dispensed with and the band-brake alone represented.

Should the car have reached the end of its route, and it be desired to start the car in the opposite direction to that in which it was running before, the cone-friction $a'$ $b'$ being connected, and the spring $c$ wound up by placing the foot on button $k$, the button $k'$ is also pressed, (to prevent the car from starting back,) and the cone-friction $a'$ $b'$ allowed to remain in connection till such time as required to start the car in the backward direction, when the foot, or pressure, is taken from $k'$, and the car moves in the direction from which it came. The cone-friction $a\ b$ and band-friction $d'$ are then used to stop the car, (from the other platform,) instead of the cone $a'\ b'$ and band $d$, as in the former cases.

Having thus described our invention, what we claim as new, and desire to secure by Letters Patent, is—

1. In a car-starter, the cone-friction $a\ b$, $a$ being attached to the axle by means of one or more feathers, so as to revolve with the axle and move in line therewith, and $b$ being loose upon the axle.

2. In a car-starter, the combination of the cone-friction, substantially as described, with the band-brake $d$, operated by the lever $e$ and rod and button $k$.

3. In a car-starter, the combination of the two cone-frictions with the spiral spring $c$, substantially as described.

4. In a car-starter, the combination of the spring $c$ with the two band-brakes $b$ and $b'$, substantially as described.

5. The combination of the threaded spindle $o$, nut $m$, shaft $i$, and forked yoke $l$, for operating the cone-frictions $a$ and $a'$.

In testimony that we claim the foregoing as our own we affix our signatures in presence of two witnesses.

JNO. W. MOORE.
JOHN A. SVEDBERG.

Witnesses:
A. G. HEYLMAN,
J. TYLER POWELL.